United States Patent [19]

Lundback

[11] Patent Number: 4,777,428
[45] Date of Patent: Oct. 11, 1988

[54] DEVICE FOR COMPENSATION OF TRANSFER FUNCTIONS

[76] Inventor: Arvid Lundback, Hogasavagen 20, S-15131 Sodertalje, Sweden

[21] Appl. No.: 253,743

[22] PCT Filed: Aug. 1, 1980

[86] PCT No.: PCT/SE80/00200
§ 371 Date: Apr. 3, 1981
§ 102(e) Date: Mar. 27, 1981

[87] PCT Pub. No.: WO81/00452
PCT Pub. Date: Feb. 19, 1981

[30] Foreign Application Priority Data

Aug. 1, 1979 [SE] Sweden .................. 7906585

[51] Int. Cl.$^4$ .......................... G01D 3/02
[52] U.S. Cl. .................. 324/57 R; 318/611; 318/621; 318/632
[58] Field of Search .......... 318/611, 615, 621, 628, 318/632, 678; 324/57 R, 125; 307/263, 493, 494; 333/14; 374/169

[56] References Cited

U.S. PATENT DOCUMENTS

| | | | |
|---|---|---|---|
| 3,613,419 | 10/1971 | Silva | 318/621 X |
| 3,828,280 | 8/1974 | Dolby | 333/14 |
| 3,864,554 | 2/1975 | Chevalier | 318/611 X |
| 3,875,537 | 4/1975 | Dolby | 307/264 |
| 4,066,958 | 1/1978 | Burke | 324/125 |
| 4,675,835 | 6/1987 | Pfleiderer | 364/571 |

OTHER PUBLICATIONS

Aseltine: "Transform Method in Linear System Analysis", McGraw Hill–1958—Chapter 9.
Analog Devices: "Non-Linear Circuits Handbook", 1974—pp. 37–39.
Heinlein et al: "Active Filters for Integrated Circuits", Springer-Verlag, N.Y.-1974—pp. 357.
Chance et al: "Waveforms"–1949—McGraw Hill, (ch. 2).
Machol et al.: "System Engineering Handbook"—1965, McGraw Hill Co. (ch. 29).
Lefferts: "The Monolithic Temp. Transducer-A New Interfacing Concept", National Semi.-AN-132; Dec. 1974.

Primary Examiner—Reinhard J. Eisenzopf
Assistant Examiner—Jose M. Solis
Attorney, Agent, or Firm—Pollock, Vande Sande & Priddy

[57] ABSTRACT

The present invention is a device for compensation of electric transfer functions of electric or electronic sensors (G), detectors, instruments or four-poles. According to the invention, the signal from the unit (G) to be compensated is connected to a differential amplifier (D) with a feed-back network (Z) having a transfer function that is substantially the same as the transfer function to be compensated. The compensating device has a transfer function that approximately is inverse to the transfer function of said sensor (G). The signal that the sensor senses and that is distorted by the nonlinear transfer function of the sensor is then restored. The feed-back network can either be passive or consist of electrically controllable active filters.

5 Claims, 1 Drawing Sheet

DEVICE FOR COMPENSATION OF TRANSFER FUNCTIONS

The present invention consists of a device for compensation of electrical transfer functions of electric or electronic sensors, instruments or fourpoles.

When mesuring for instance temperatures by the use of thermo element or thermistor instruments or when measuring optical radiation by the use of thermopile radiometers or some pyroelectric radiometers, the rise time of the instrument in many cases is very long compared to the duration of the variations of the signal being measured, and often constitutes a problem.

The rise time of thermopile detector is often in the order of a half to one minute. When for instance a radiation with fast variations (within seconds or parts of) is measured, the signal available on the output terminal of the instrument, as a rule does not have the slightest similarity with the unit being measured. This is due to fact that the modulation transfer function (MTF) of the detector is not linear within the actual frequency range. In these cases the instrument or detector is often said not to be fast enough. Then it is of no consquence that the amplifier to which the detector or instrument is connected is fast and has a linear transfer function.

There are a large amount of instruments and devices where the detector or sensor is sensitive but too slow for measuring fast processes. In these cases a device in accordance with the present invention would make the instrument suitable also for measuring signals with rapid variations. Instruments, which are sensitive but slow are made by the most advanced instrument manufacturers in the worlds leading industrial nations and well known.

As it undoubtedly is of great value to have instruments with shorter time constants, so far simple methods of realizing this with instruments having slow sensors have been unknown. On the other hand, the increasing of the time constant of a fast instrument has never been a problem.

SUMMARY OF THE INVENTION

The present invention solves these problems in the way that is described in the distinguishing part of the attached (main)claim. It is anticipated, that the sensor, detector or four pole, of which the transfer function is to be compensated, is connected to the non-inverting input of a high amplification differential amplifier the output of which is connected to an output terminal as well as, through a feed-back network, with a transfer function arranged to be as similar with the transfer function of the sensor, detector or four pole as possible, to the inverting input of the differential amplifier.

It may be suitable to let the feed-back network consist of a number of adjustable filters. Alternatively as a rule it is possible to use passive filters. The filter types referred to in these cases are proportional filters, deriving and integrating filters.

It may also be suitable to bypass the compensating device, constituted by the present invention, without having to disconnect it electrically.

It is suitable to have a switch, that connects the signal from the sensor, detector or four pole directly to the output terminal of the device while the differential amplifier with its feed-back network is arranged to be disconnected.

Finally it might be suitable to make the compensating device, constituted by the present invention, as a separate unit, that can be connected between the instrument of which the tranfer function is to be compensated, and a read out unit such as a dial instrument or a writing oscillograph.

DESCRIPTION OF THE FIGURES

An example of how the compensating device can be made in accordance with the present invention, is described in detail with reference to the attached FIGS. 1-5, thus

DESCRIPTION OF A PREFERRED EMBODIMENT

Figure 1:
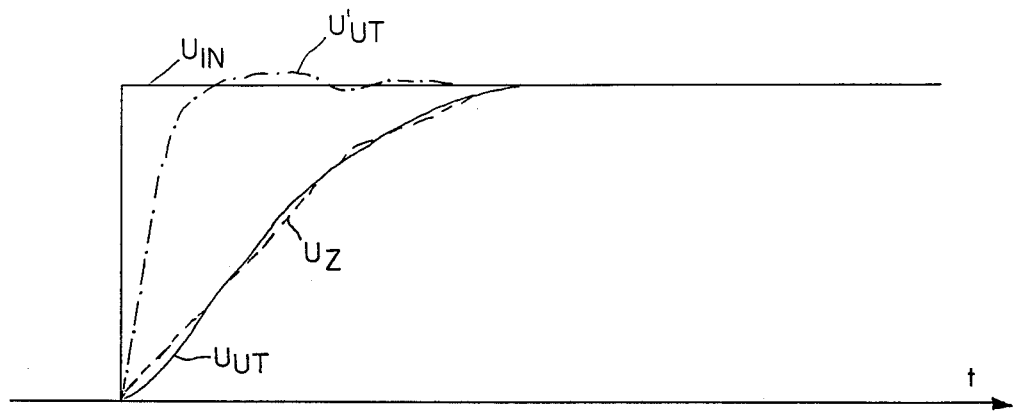
FIG. 1 shows the output from a typical sensor when the measured unit is a step function.

FIG. 1 shows an example of what the output, $U_{ut}$, from an instrument with a sensor or from a four-pole, might look like if the input signal is a step function. The detector or sensor of the instrument can for instance consist of a photo diode of pyroelectric type that is directed towards a lamp, that is switched on at the moment t or of a thermo element, that at the moment $t_o$ is dipped into hot water or a four-pole a step voltage is connected.

When the input signal $U_{in}$ is applied to the detector/instrument, the curve $U_{ut}$ shown in FIG. 1 is obtained from the instrument output. The relationship between $U_{in}$ and $U_{ut}$ is derived from the instrument tranfer function $K(\omega)$. The difference between $U_{in}$ and $U_{ut}$ can be considered as the measurement error, caused by the instrument that has been used.

If an accessory in accordance with the invention is connected to the instrument output terminal and if the feedback network Z (FIG. 5) has such a transfer function $K'(\omega)$ so that the voltage $U_z$ would be the response to a step function of the type $U_{in}$, the voltage $U'_{ut}$ is obtained on the output terminal of the accessory.

The error, $U_{in}$ minus $U'_{ut}$ is now considerably smaller and the equipment is faster. The error is reduced not only for step functions on the input but for any arbitrary input function. The aim is to make the transfer function of the feed-back network as identical with the transfer function of the instrument as possible. Exactly identical transfer functions produce no measuring errors at all and we get $U_{ut} = U_{in}$ which is shown below. It is also possible to show that a difference between the transfer functions $K(\omega)$ and $K'(\omega)$ that causes the voltages $U_{ut}$ and $U'_{ut}$ to differ with n % also will cause a measuring error $(U_{in} - U_{ut})$ that is about n % provided n is not too large. This means that the device in accordance with the invention even if the transfer function $K(\omega)$ does not exactly resemble the transfer function $K(\omega)$ of the sensor, detector or four-pole used, will work as an error reducing device, which is of great importance.

Figure 2:
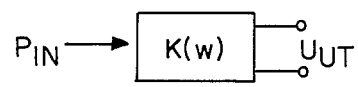
FIG. 2 shows a sensor.
Figure 3:
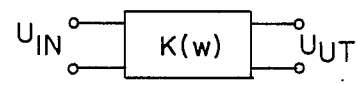
FIG. 3 shows a four-pole.

FIG. 2 shows a sensor, detector or measuring instrument with the transfer function $K(\omega)$. The input unit $P_{in}$ gives the voltage $U_{ut}$ on the output terminal of the sensor, detector or instrument. FIG. 3 shows the equivalent date for a general electric four-pole.

Figure 4:
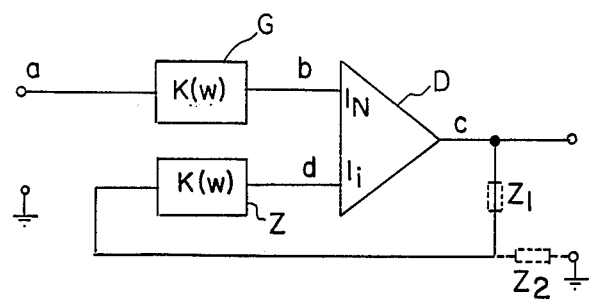
FIG. 4 shows the fundamental arrangement of a compensating device in accordance with the present invention and FIG. 5 shows a more complete compensating device in accordance with the invention, made as an external accessory for an instrument.

FIG. 4 shows a compensating device in accordance with the invention, for a sensor etc, as shown in FIG. 2 or FIG. 3, with the transfer function $K(\omega)$. The output of the detector is connected to the non-inverting input of a differential amplifier D. A feed-back network, also with the transfer function $K(\omega)$—the transfer functions of the feed-back network and the sensor are anticipated to be identical—is connected between the inverting input and the output terminals of the differential amplifier.

The output voltage at point c is then the amplification f times the voltage difference between the two inputs of the differential amplifier i.e. $f(b-d)=c$ which means that $b-d=c(1/f)$. Because f should be chosen as large as possible, the voltage difference $b-d$ will be negligibly small. As it is known, the aim of the device is to make the voltage in the point c to be a true copy of the voltage in the point a. If this would be the case, the voltage $b-d$ would be exactly null, as the transfer functions of the sensor and the feed-back network are anticipated to be exactly equal. As the device does not work unless $b-d=c(1/f)$, it is not possible for c to be an exact copy of a, but $c=a(1-1/f)$, thus the difference between the voltages in the points a and c can be reduced by increasing the amplification f. In the practical case the expression $c=a$ is very near the truth. If for some reason f not can be chosen high, it is still possible to eliminate the factor $(1-1/f)$ by introducing a voltage divider $z_1$, $z_2$, that divides the feed-back voltage in the relationship $1/(1-1/f)$.

Figure 5:
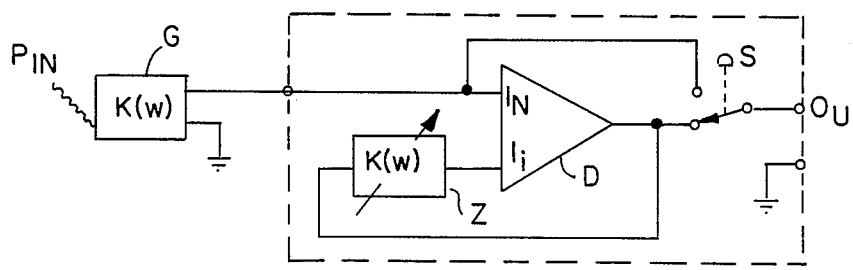

FIG. 5 shows a practical way of making the device, constituted by the present invention. Hereby the feed-back network 2 is formed by a number of variable active or passive networks or filters and with a switch S that can disconnect the signal from the differential amplifier and connect it directly to the output terminal. Thus it is possible to achieve the unaffected signal from the instrument G without having to disconnect the transfer function compensating device, that constitutes the invention. Thus the desccribed device can be installed in existent instruments or systems or be connected as a separate unit, with its own power supply if that is disirable. Of course it can be integrated in a design already when it is planned and does not need to be considered a device only for completion of already existing devices. Eventually, the differential amplifier should be chosen fast enough as otherwise its own transfer function must be considered, but as a rule this is not a problem.

The invention is founded on the fact that the transfer function of the sensor, detector or instrument in question is constant and unchangeable. As a rule, this is the case, but in some cases the transfer function might be subject to changes due to e.g. the temperature or some other parameter. Then it is often advantageous to sense the parameter and let it control one or several of the filters in the feed-back network. It is possible to keep the transfer function compensated even under extreme conditions.

I claim:

1. A compensation circuit for compensating a signal generating circuit having a long response time to decrease the overall response time for said circuit comprising:
    a differential amplifier having a noninverting input, inverting input and output terminals; and
    a feedback network having a signal transfer function substantially the same as said signal generating circuit transfer function, connected between said output and inverting input terminals, said differential amplifier noninverting input terminal connected to receive a signal from said signal generating circuit, whereby said differential amplifier input terminals are connected to networks having substantially the same transfer function, and providing at said output terminal a compensated signal which has a shorter response time than the signal from said signal generating circuit.

2. A compensation circuit according to claim 1, wherein said feed-back network comprises at least one filter network.

3. A compensation circuit according to claim 2, wherein one or more of said filters are electrically controlled.

4. A compensation circuit according to claim 1 further comprising a switch means for bypassing said differential amplifier.

5. A compensation circuit according to claim 1, wherein said compensation circuit comprises a separate unit adapted to be connected between said signal generating circuit to be compensated and a read out unit.

* * * * *